(12) United States Patent
Bui et al.

(10) Patent No.: US 7,362,537 B2
(45) Date of Patent: Apr. 22, 2008

(54) VELOCITY ADAPTIVE COMPENSATOR FOR A SYNCHRONOUS SAMPLING TIME-BASE SERVO SYSTEM

(75) Inventors: Nhan Bui, Tucson, AZ (US); Randy Inch, Tucson, AZ (US); Eiji Ogura, Tucson, AZ (US); Kazuhiro Tsuruta, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/477,001

(22) Filed: Jun. 28, 2006

(65) Prior Publication Data

US 2006/0245104 A1    Nov. 2, 2006

(51) Int. Cl.
  *G11B 5/584*    (2006.01)
(52) U.S. Cl. .................................................. 360/77.13
(58) Field of Classification Search ..................... None
  See application file for complete search history.

(56) References Cited

U.S. PATENT DOCUMENTS 6,754,026 B1 *    6/2004    Koski ...................... 360/73.04

* cited by examiner

*Primary Examiner*—K. Wong
(74) *Attorney, Agent, or Firm*—Cardinal Law Group

(57) ABSTRACT

Disclosed are a system, a method, and article of manufacture to provide a velocity adaptive compensator for a synchronous sampling servo control system.

12 Claims, 12 Drawing Sheets

VELOCITY ADAPTIVE COMPENSATOR FOR A SYNCHRONOUS SAMPLING TIME-BASE SERVO SYSTEM

CROSS-REFERENCES TO RELATED APPLICATIONS

The present application is related to application Ser. No. 11/012,950, entitled "A compensator for a synchronous sampling time-base servo system", filed on an even date herewith, the disclosure of which is hereby incorporated by reference in its entirety.

TECHNICAL FIELD

The disclosure herein relates to servo control systems.

DETAILED DESCRIPTION OF EMBODIMENTS

The following embodiments are described with reference to the Figures. While the description proceeds in conjunction with the embodiments, it will be appreciated by those skilled in the art that it is intended to cover alternatives, modifications, and equivalents as may be included within the spirit and scope defined by the appended claims.

Figure 1:
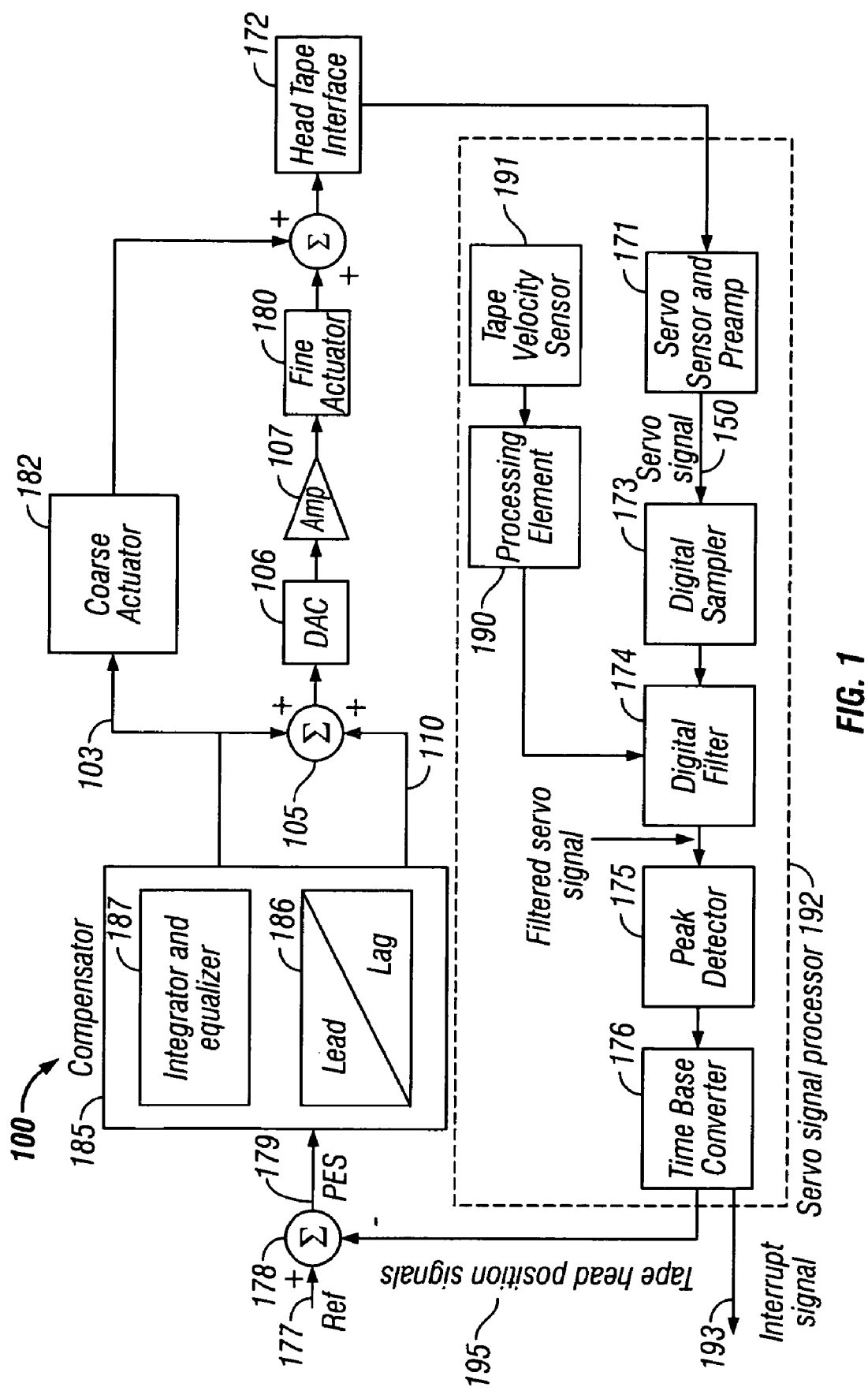
FIG. 1 is a diagram of a servo control system for controlling the position of a tape head relative to a tape.

FIG. 1 is a block diagram of a portion of a servo control system 100 for a track following servo system in a data storage tape drive. A description of one implementation of a track following servo system using timing based servo signal for use with embodiments described herein is disclosed in U.S. Pat. No. 6,021,013, the disclosure of which is hereby incorporated by reference. It will be appreciated by those skilled in the art that although the following detailed description proceeds with reference being made to a magnetic tape drive with a time based servo system, the embodiments described are not intended to be limited to a magnetic tape drive with a time based servo system. Rather, the embodiments may be used with optical tape or other tape that may be used in any tape drive with any type of servo system.

Figure 2:
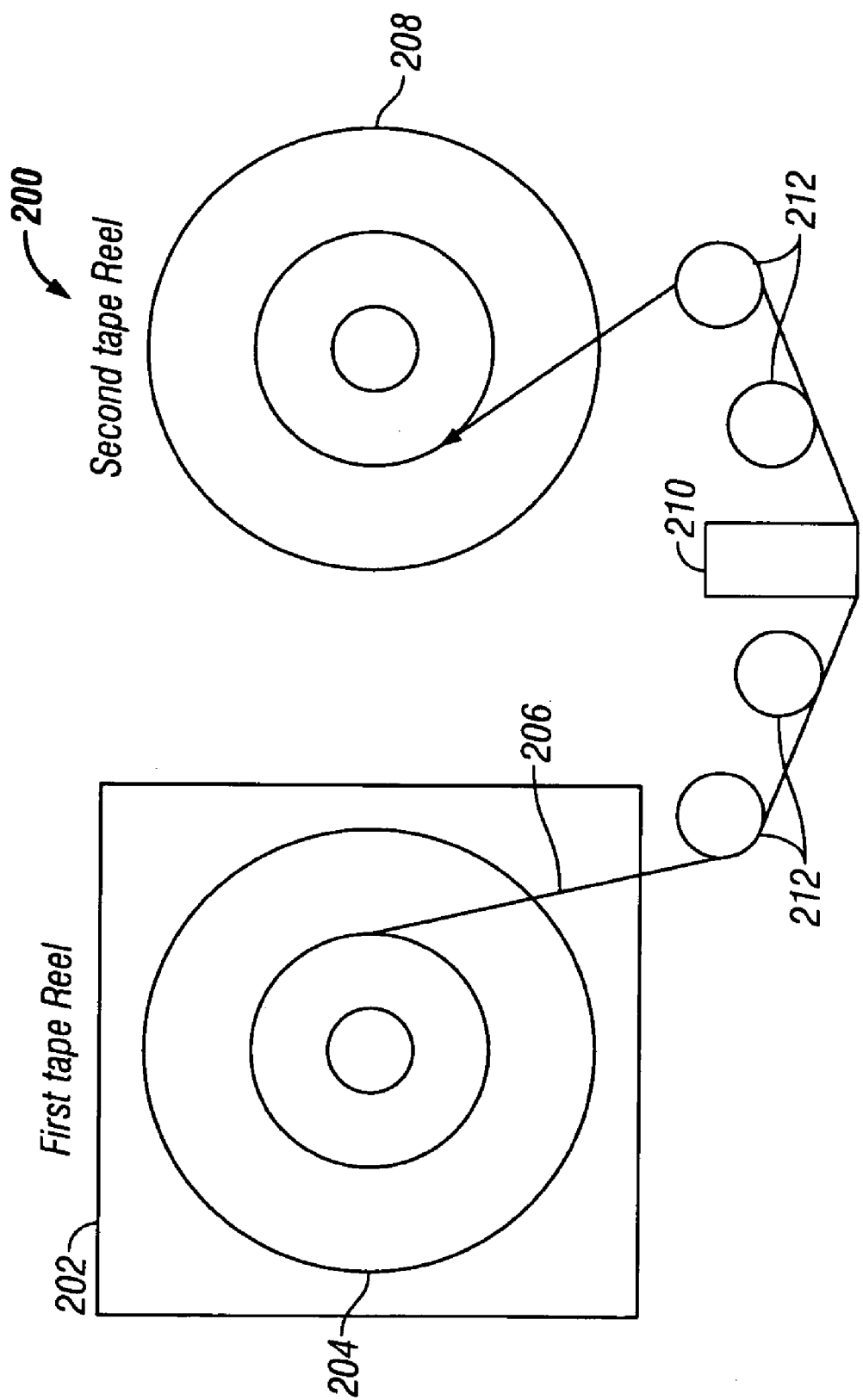
FIG. 2 is a diagram illustrating the tape path in a tape transport system.

With reference to FIG. 1, the tape head signals are sensed by servo sensor and preamp 171 to produce a servo signal 150 from tape head to media interface 172. Tape head to media interface 172 may be better understood with reference to FIG. 2. FIG. 2 is a diagram illustrating the tape path of an exemplary tape transport system 200. Tape transport system 200 illustrated in FIG. 2 accepts tape cartridge 202 containing first tape reel 204 on which is wound a length of tape 206. The tape transport system 200 includes a second tape reel 208, at least one tape head 210 and guide rollers 212. When cartridge 202 is inserted into the tape transport system 200, tape 206 is automatically threaded around rollers 212, across tape head 210 and onto second tape reel 208. Motors (not shown) operatively coupled to reels 204 and 208 pull tape 206 at a tape velocity, V, across the tape head 210 which reads/writes information to/from the tape in a known manner. The motors may also move tape 206 from one reel to another at high speed in fast forward and rewind operations. The motors may be directly coupled to first tape reel, 204 and second tape reel, 208 or there may be a mechanical drive system between the reels and the motor(s). Whether directly coupled or coupled through a mechanical drive system, the type of coupling determines a mechanical relationship between the motor(s) and the tape reels. The mechanical drive system could be for example, gears, belts, pulleys, clutches, etc. All tape operations may occur with the tape 206 moving in either direction. Thus, either first tape reel 204 or second tape reel 208 may serve as the supply reel or the take-up reel, depending upon the direction of the tape 206. In FIG. 2, first tape reel 204 within cartridge 202 is shown serving as the tape supply reel while the second tape reel 208 is shown serving as the take-up reel. In this disclosure, the term "supply reel" refers to the reel operating as the supply reel at the present time and the term "take-up reel" refers to the reel operating as the take-up reel at the present time. Moreover, the terms "supply motor" and "take-up motor" refer to the motors operatively coupled to the supply and take-up reels, respectively. The type of tape transport system 200 shown in FIG. 2 is for illustrative purposes only and the embodiments described herein may be employed with other types of transport systems.

Referring to FIG. 1, servo signal 150 derived from servo sensor and preamp 171 is the result of moving a magnetic tape (i.e. tape 206) along a tape head (i.e. tape head 210) at a tape velocity, V, at head to media interface 172. Servo signal 150 from servo sensor and preamp 171 is sampled by digital sampler 173 and filtered by digital filter 174 and then provided to peak detector 175. Servo signal 150 from servo sensor and preamp 171 is sampled by digital sampler 171 at a sampling rate that may vary with the tape velocity. The sampling of servo signal 150 by digital sampler 173 produces a digital representation of servo signal 150 that is suitable for processing by a digital processing apparatus, for example a central processing unit or a digital filter. Digital filter 174 receives the digital representation of servo signal 150 produced by digital sampler 171 and performs filtering operations to remove unwanted noise from servo signal 150 to produce a filtered servo signal.

Figure 3:
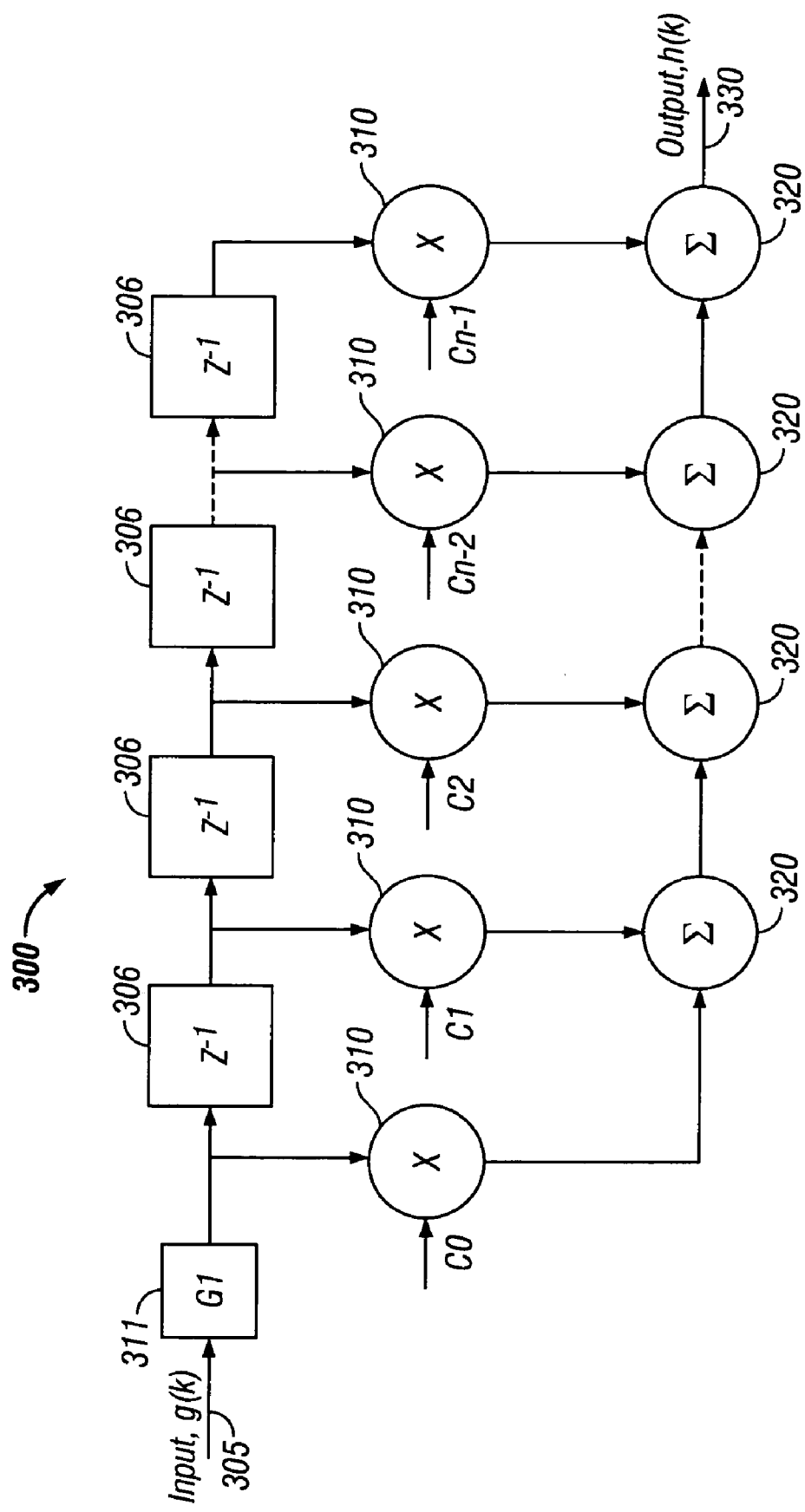
FIG. 3 is a diagram of a finite impulse response digital filter.

FIG. 3 shows one example of a Finite Impulse Response (FIR) digital filter 300 that may be used for digital filter 174 and/or compensator 185 (FIG. 1). Digital filter 300, may be implemented in code, logic, hardware logic (e.g., an integrated circuit chip, Programmable Gate Array (PGA), Application Specific Integrated Circuit (ASIC), etc.). One skilled in the art will recognize that other types of digital filters may be used. FIR digital filter 300 has an input 305 that accepts a sampled version of servo signal 150 and an output 330 that produces a filtered version of servo signal 150 to peak detector 175. The filter comprises a series of time delay elements $Z^{-1}$ 306, multipliers 310 for multiplying digital filter coefficients $C_0, C_2, C_3, \ldots C_{N-2}$ and $C_{N-1}$ and summers 320. In one embodiment, FIR digital filter 300 comprises a seventeen stage digital filter resulting in N=17, however N may vary depending upon the system used and the performance desired. For use in digital filter 174, the seventeen digital filter coefficients $C_0, C_2, C_3, \ldots C_{15}$ and $C_{16}$ are determined by obtaining seventeen equally spaced samples of a portion of each average servo signal 150 that are symmetrical about the horizontal center point for each tape velocity.

Referring to FIG. 1, digital filter 174 is controlled by processing element 190. Processing element 190 may comprise a central processing unit (CPU), an alternative digital processing apparatus, ASIC, dedicated logic circuitry, etc., or a combination thereof. Tape velocity sensor 191 senses and provides the tape velocity to processing element 190. Processing element 190 provides digital filter coefficients to digital filter 174 and enables or disables digital filter 174 depending upon the condition of the tape velocity. Digital filter 174 provides a filtered version of servo signal 150 to peak detector 175. Peak detector 175 determines the location in time of the peaks of the filtered servo signal 150. Time base converter 176 receives the output from peak detector 175 and converts the signal into a tape head position signal for input to compensator 185 (FIG. 1). In the preferred embodiment, the output signal from peak detector 175 goes high on a positive-going transition (leading edge) and goes low on a negative-going transition, permitting time base converter 176 to distinguish between the two polarities. As noted above, the tape head position signal is generated by time base converter 176. The function of time base converter 176 is to perform the necessary calculations to make the tape head position signal available to the remainder of the servo control system. Time base converter 176 may use a crystal oscillator as a reference to accurately measure the time between peaks to derive a tape head position signal. Time base converter 176 provides tape head position signals 195 and an interrupt signal 193 to the remaining components of servo control system 100. Collectively, elements 171, 173, 174, 175, 176, 190 and 191 are referred to herein as servo signal processor 192. Servo signal processor 192 produces tape head position signals 195 and interrupt signal 193 by processing signals obtained from the tape head as the tape moves along the tape head, at a tape velocity, V. For optimum performance of the system, tape head position signals 195 and interrupt signal 193 are provided coincident in time and with a minimum delay from the time a signal is produced from the tape head at head tape media interface 172.

Tape head position signals 195 are compared to reference signal 177 by comparator 178 to determine position error between the head and a desired position related to the defined servo tracks, called the "position error signal", or "PES", on line 179. Comparator 178 may be implemented in compensator 185 (FIG. 1) by use of a processing system (i.e. processing system 600, FIG. 6). Tape head position signals 195 provide a value indicative of the relative lateral position of the tape head relative to the tape. Position error signal or PES provides a value indicative of the difference between the desired lateral position of the tape head relative to the tape and the actual lateral position of the tape head relative to the tape. For the disclosure herein, the lateral position of the tape head relative to the tape means the position of the tape head relative to the tape in a direction perpendicular to the movement of the tape by tape transport system 200.

A compound actuator is used to position the tape head (i.e. tape head 210) relative to the tape. An example of the use of a compound actuator m a tape drive is described in U.S. Pat. No. 6587303: entitled "Servo Control of a Coarse Actuator", the disclosure of which is hereby incorporated by reference In the typical compound actuator, the fine actuator 180 follows the track guiding disturbances, as determined by the PES, to position the data head(s) of the tape head in the center of the data track or tracks. In certain embodiments, fine actuator 180 has relatively small mass yielding a wide bandwidth response and is thus able to follow high frequency disturbances. In certain embodiments, fine actuator 180 may have a very limited range of travel in order to provide the high bandwidth. In certain embodiments, coarse actuator 182 carries the fine actuator 180 from track to track in accordance with a seek function. The compound actuator servo system typically has a compensator function 185 (FIG. 1) in the position error signal loop, which is designed to enable maximum bandwidth with adequate stability margins.

In certain embodiments, compensator function 185 (FIG. 1) modifies the PES signal by applying a variable gain to the PES signal, which gain is based upon the frequency of the input PES signal 179, or, from another viewpoint, upon the rates of change of the input PES signal. In certain embodiments, compensator function 185 includes an integrator and equalizer 187 and other transfer function elements, such as a lead/lag functional element 186, to achieve the desired static and dynamic system performance and overall stability. Any or all of the transfer function elements of compensator 185 may be implemented as a filter, either an analog filter employing discrete components, or a digital filter, such as an IIR (infinite impulse response) or as a FIR (finite impulse response), or as microcode causing a microprocessor to perform the function. This results in an integration function signal on connection 103, and the lead/lag gain as applied to the PES results in a signal on line 110. The signals are summed by a summer 105 and, if digital, are supplied to a digital to analog converter 106. A power amplifier 107 then applies the signal to the fine actuator 180, operating the fine actuator to translate the head in a manner to reduce the determined position error. Alternatively, a digital driver may be employed to operate the fine actuator 180. The result is that the servo controller uses the position error signal to control the position of a tape head relative to the tape by controlling coarse actuator 182 and/or fine actuator 180. In certain embodiments, servo control system 100 derives the PES from the tape head position signals 195 and servo control system 100 uses the PES to control the position of the tape head relative to the tape.

In certain embodiments compensator 185 may be implemented by finite impulse response (FIR) digital filter 300, shown in FIG. 3 and described above. To determine the digital filter coefficients, $C_0, C_2, C_3, \ldots C_{N-2}$ and $C_{N-1}$ the complete system is designed to specifications for the track following error, servo bandwidth, etc. A frequency domain transfer function, H(s) for compensator 185 is obtained from the design requirements. The frequency domain transfer function for compensator 185 may be transformed to the time domain to obtain impulse response, H(t) for compensator 185. The digital filter coefficients $C_0, C_2, C_3, \ldots C_{N-2}$ and $C_{N-1}$ may be determined by sampling impulse response, H(t) at N equally spaced sample points, where N is the order of the digital filter used. Output h(k) 330 is the summation of the input, g(k), multiplied by the delay elements (i.e. $Z^{-1}$ 306) and the digital filter coefficients, $C_0$, $C_2$ $C_3$, ... $C_{N-2}$ and $C_{N-1}$ constants, (i.e. elements 310), yielding, $$h(k) = G1\left[\sum_{n=0}^{N} C_n g(k-n)\right],$$

where N is the order of the filter. For example, for a fourth order filter (N=4), yielding, $$h(k)=G1[C_0 g(k)+C_1 g(k-1)+C_2 g(k-2)+C_3 g(k-3)=C_4 g(k-4)].$$

G1 is the gain coefficient for adjusting the gain of servo control system 100 to achieve the desired bandwidth via the appropriate crossover frequency.

Figure 4:
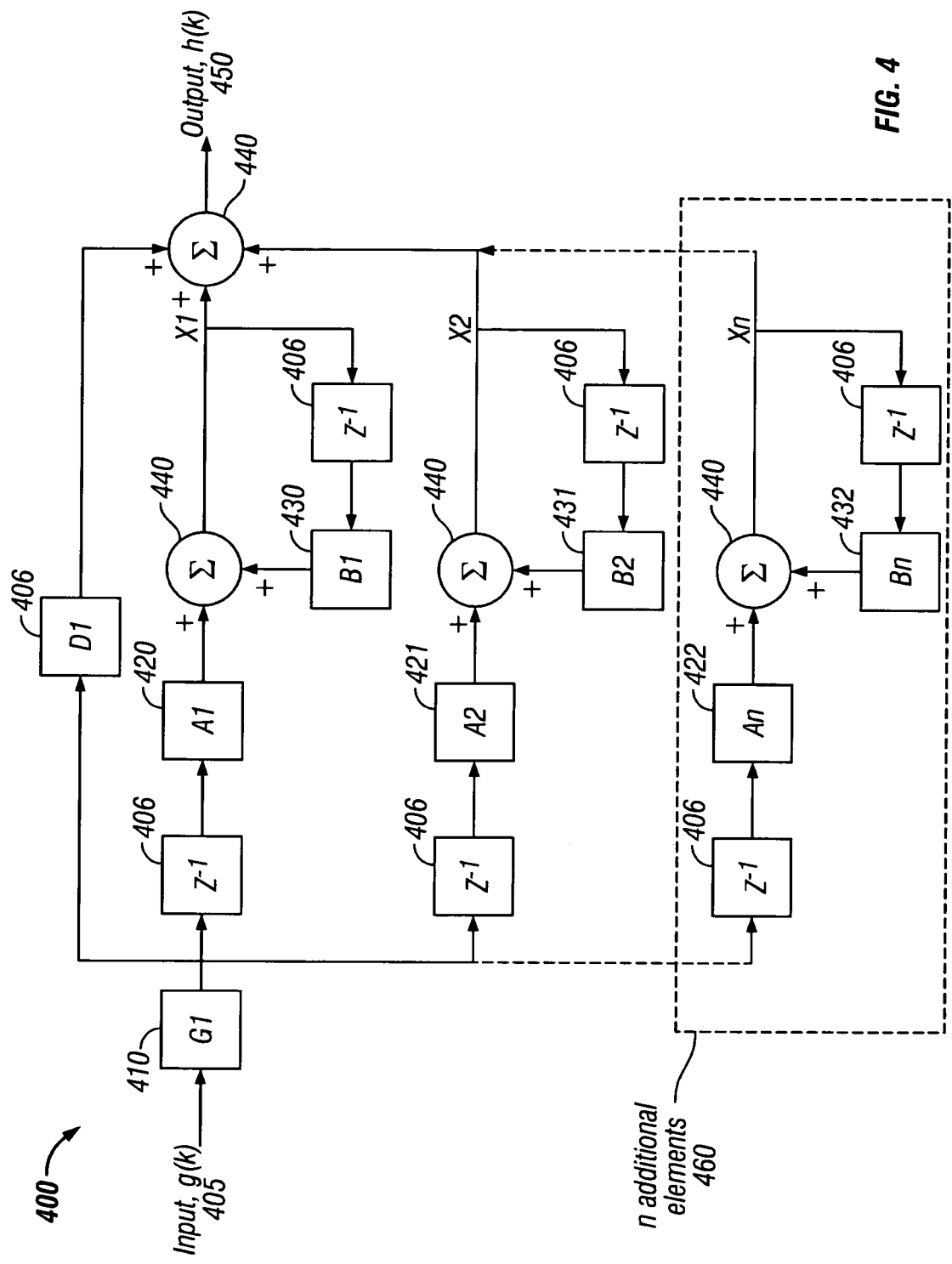
FIG. 4 is a diagram of an infinite impulse response digital filter.

In certain embodiments compensator 185 may be implemented by an infinite impulse response (IIR) digital filter, such as, for example IIR digital filter 400, shown in FIG. 4. Digital filter 400 processes input g(k) 405 to produce output h(k) 450. The z domain transfer function, T(z), for digital filter 400 may be written as a summation of a partial fraction expansion, $$T(z) = \frac{h(z)}{g(z)} = G1\left[D1 + \sum_{n=1}^{N} \frac{A_n}{(z-B_n)}\right],$$

where N is the order of the filter. For example, for a second order filter (N=2), yielding, $$T(z) = G1\left[D1 + \frac{A_1}{z-B_1} + \frac{A_2}{z-B_2}\right].$$

Output h(k) 450 is the summation of processing elements (i.e. element 460), $$h(k) = G1\left[D1(g(k)) + \sum_{n=1}^{N} X_n(k)\right],$$

where $$X_n(k) = A_n g(k-1) + \frac{B_n}{G1} X_n(k-1)$$

and N is the order of the filter. For example, for a second order filter (N=2), yielding, $$h(k)=G1[D1(g(k))+A_1 g(k-1)+A_2 g(k-1)]+B_1 X_1(k-1)+B_2 X_2(k-1)$$

Figure 5:
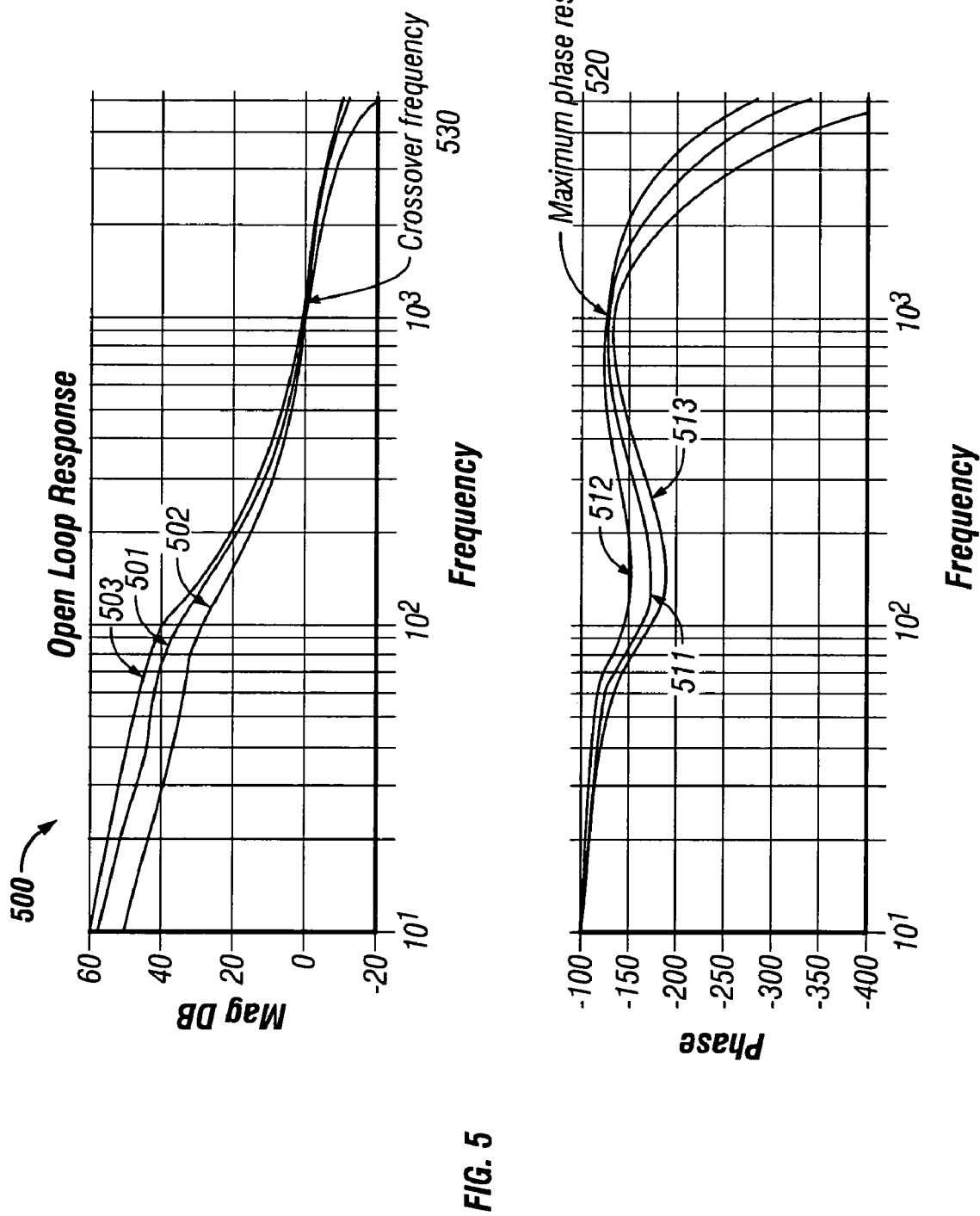
FIG. 5 is a graph of frequency domain open loop responses for transfer functions of a servo control system.

In certain embodiments, the constants for digital filter coefficients D1, A1, A2, ... An, B1, B2, ... Bn and the gain coefficient G1 are determined by designing compensator 185 according to system specifications. For example, a graph of three different open loop transfer functions, 500 for a servo control system for controlling the position of a tape head relative to a tape are shown in FIG. 5. Open loop transfer functions 500 are examples that may be determined by designing a compensator to achieve stability with a given actuator (i.e coarse actuator 182 and/or fine actuator 180) and a specified sampling rate at three different crossover frequencies. Curves 501, 502 and 503 are the magnitude responses of the open loop transfer functions 500, with crossover frequency 530 indicating the approximate location on curves 501, 502 and 503 where the curves cross the 0 db line. Curves 511, 512 and 513 are the phase responses of the open loop transfer functions, 500 with maximum phase response 520 indicating the approximate location on curves 511, 512 and 513 where the curves exhibit a local maximum near the respective crossover frequencies. The digital filter coefficients D1, A1, A2, ... An, B1, B2, ... Bn and the gain coefficient G1 for any one of the open loop transfer functions 500 may be determined by obtaining the partial fraction expansion of the z plane transformation of the respective frequency domain transfer function of the compensator necessary to achieve the respective open loop transfer function. A step by step description of the process to design a compensator for a digital control system is available in the 1997 University of Arizona Master of Science Thesis entitled "Modeling and simulation of a digital focusing servo control system for an optical disk tester", by Farah Bates.

Figure 6:
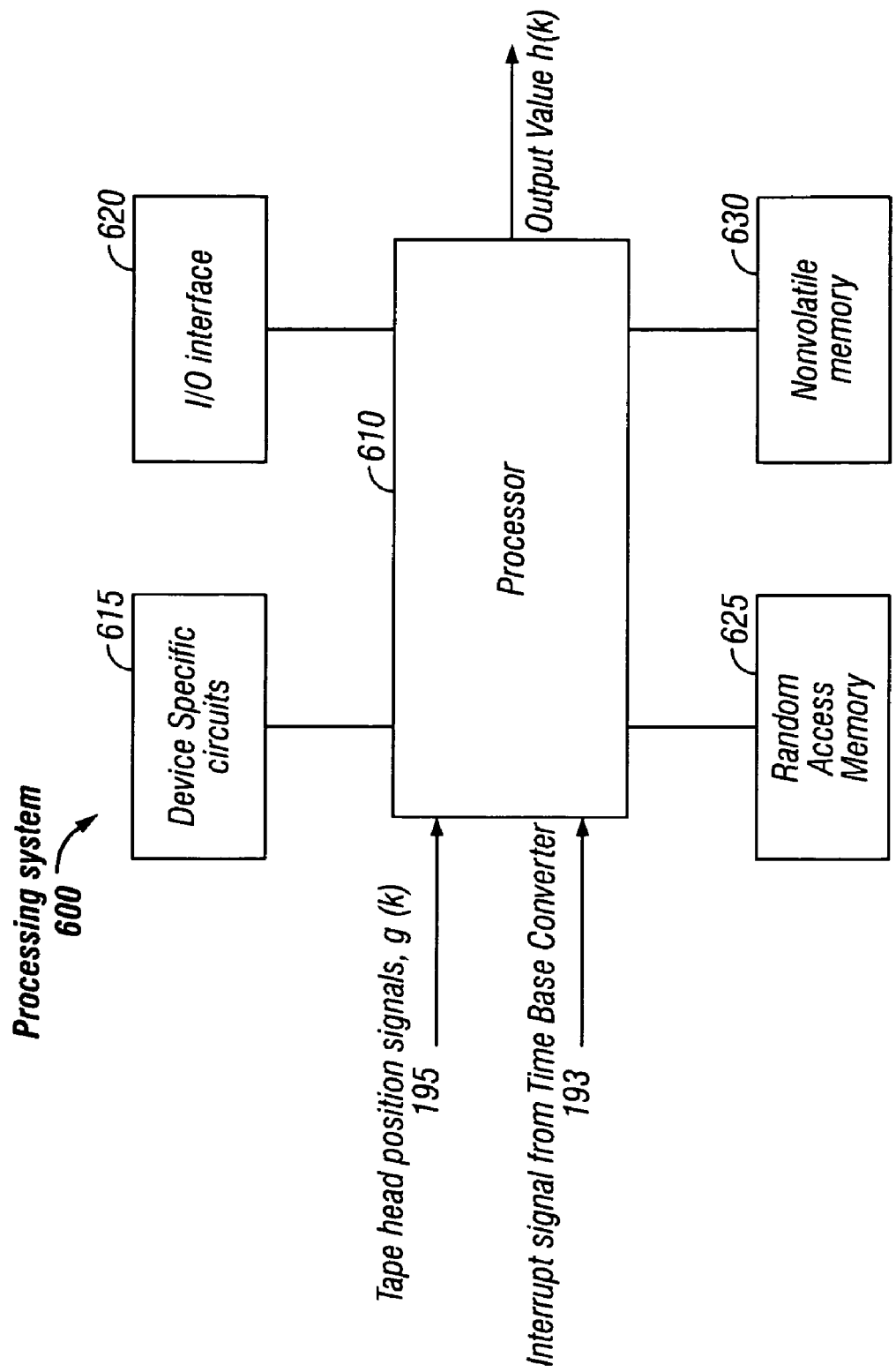
FIG. 6 is a diagram illustrating an example of a processing system for performing calculations for implementing a servo control system comprising a compensator.

FIG. 6 shows one example of processing system, 600 that may be used to implement compensator 185 and other components of servo control system 100. Processing system, 600 comprises processor 610, RAM (Random Access Memory) 625, nonvolatile memory 630, device specific circuits 615, and I/O interface 620. Alternatively, RAM 625 and/or nonvolatile memory 630 may be contained in the processor 610 as could the device specific circuits 615 and I/O interface 620. Processor 610 may comprise an off the shelf microprocessor, custom processor, FPGA (Field Programmable Gate Array), ASIC (Application Specific Integrated Circuit), discrete logic, etc. RAM (Random Access Memory) 625 is typically used to hold variable data, stack data, executable instructions, etc. Nonvolatile memory 630 may comprise any type of nonvolatile memory such as PROM (Programmable Read Only Memory), BEPROM (Electrically Erasable Programmable Read Only Memory), flash PROM, battery backup RAM, MRAM (Magnetoresistive Random Access Memory), MEMS (Micro-ElectroMechanical Systems) based storage, hard disk drive, etc. Nonvolatile memory 630 is typically used to hold the executable firmware and any nonvolatile data. I/O interface 620 comprises a communication interface that allows processor 610 to communicate with devices external to the controller. Examples of I/O interface 620 may comprise serial interfaces such as RS-232 or USB (Universal Serial Bus), SCSI (Small Computer Systems Interface), Fibre Channel, etc. In addition, I/O interface 620 may comprise a wireless interface such as RF or Infrared. Device specific circuits 615 provide additional hardware to enable processor 610 to perform unique functions such as motor control of reel motors for reels 204, 208, additional actuators, cartridge loaders, DAC 106, Amp 107, etc. Device specific circuits 615 may, by way of example, comprise electronics that provide Pulse Width Modulation (PWM) control, Analog to Digital Conversion (ADC), Digital to Analog Conversion (DAC), etc. In addition, all or part of the device specific circuits 615 may reside outside processor 610. In addition to the functions described above, processor 610 accepts tape head position signals 195 and interrupt signal 193 for processing to produce an output value, h(k) that comprises signals 103 and 110.

Figure 7:
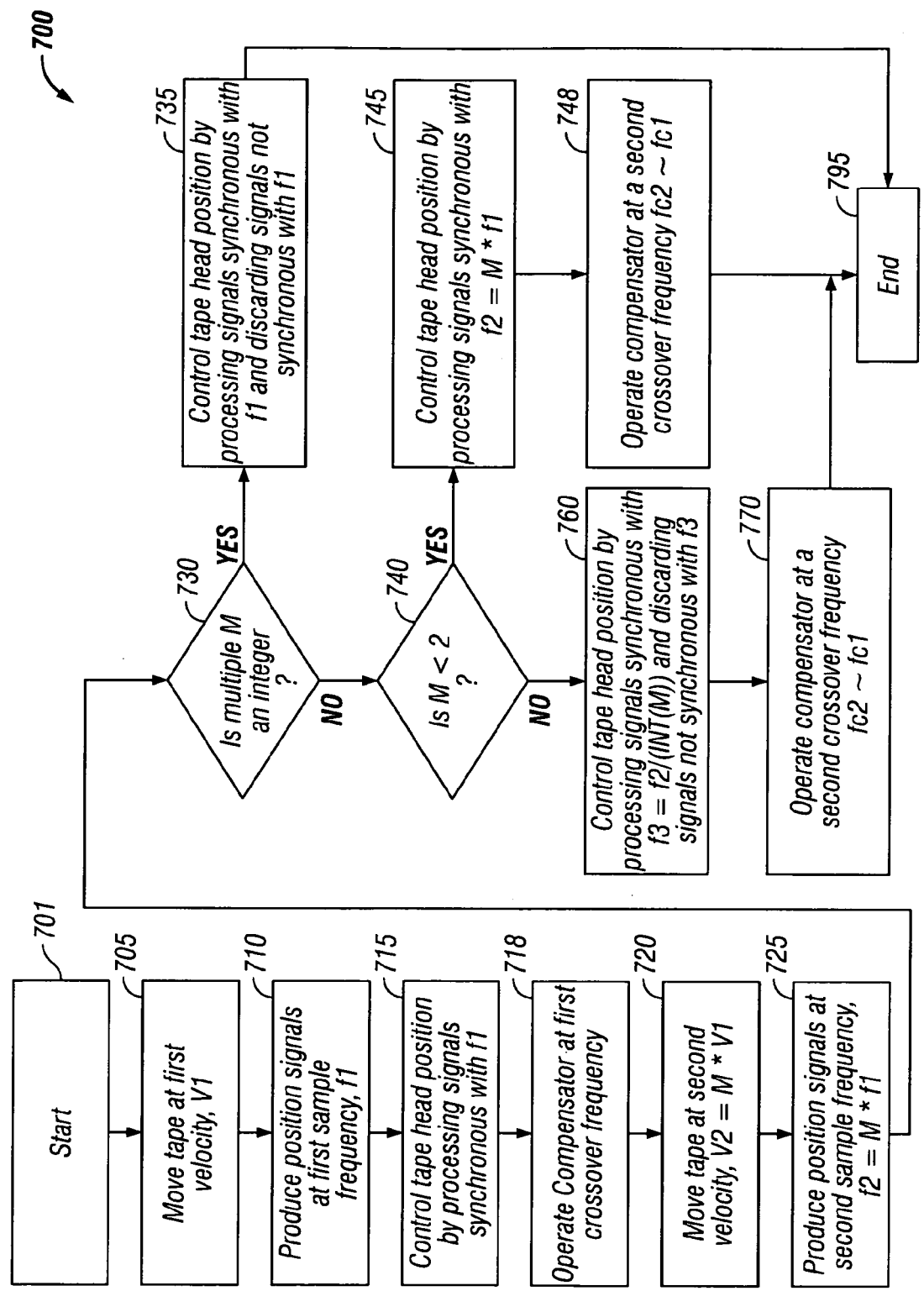
FIG. 7 shows a flowchart of steps to implement embodiments for controlling the position of a tape head relative to a tape.
Figure 8:
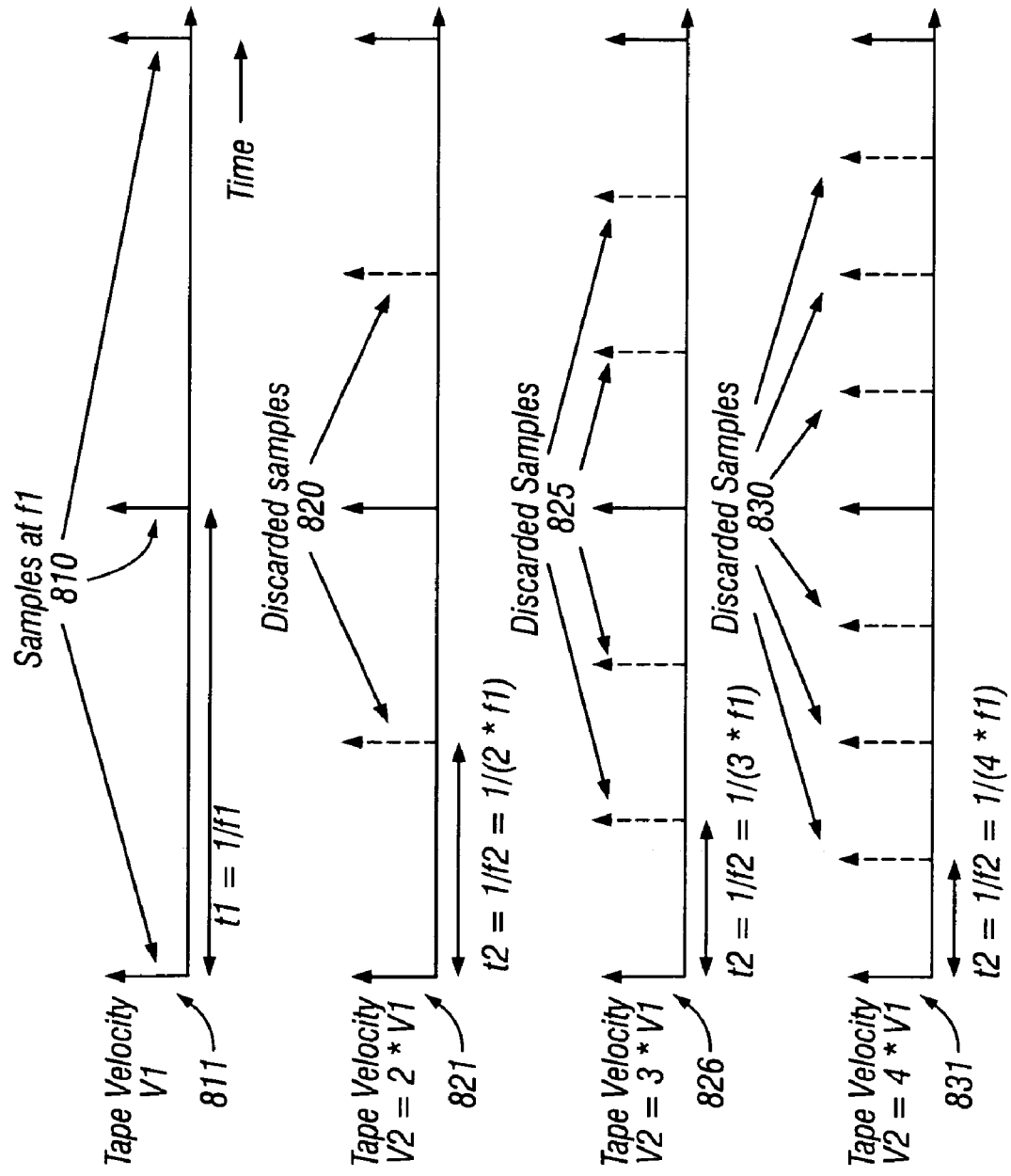
FIG. 8 is a diagram showing time periods for obtaining and discarding tape head position signals for integer values of normalized tape velocities.

One embodiment may be better understood by referring to flowchart 700 shown in FIG. 7 and the block diagram of servo control system 100 shown in FIG. 1. At step 705 the system is moving the magnetic tape (i.e. tape 206) along a tape head (i.e. tape head 210) at a first tape velocity, V1, by, for example, tape transport system 200 shown in FIG. 2. First tape velocity, V1, is a base tape velocity for operation of the tape drive and for the description herein first tape velocity, V1 and base tape velocity are the same. At step 710, servo signal processor 192 is producing tape head position signals from the tape head at a first sample frequency, f1 that is proportional to first tape velocity, V1. In certain embodiments, tape head position signals, 195 are the result of the detection of a timing based servo pattern written on tape 206. FIG. 8 shows tape head position signals 195 sample timing for various sample frequencies and tape velocities during operation of servo control system 100. When the tape velocity is moving at first tape velocity, V1, tape head position signals 195 are available at first sample frequency, f1 810 at sample period, t1=1/f1. At step 715, when operating at first tape velocity, V1, the system is controlling the position of the tape head using a control system (i.e. control system 100) that processes the first tape head position signals that are synchronous with first sample frequency, f1. The control system comprises a compensator (i.e. compensator 185) with a maximum phase response at a first crossover frequency, fc1. At step 718, the compensator (i.e. compensator 185) is operated at the first crossover frequency, fc1 to provide control of the tape head via fine actuator 180 to achieve system operation specifications. First crossover frequency, fc1, may be, for example, where curve 502 (FIG. 5) crosses the 0 db line (i.e. crossover frequency 530). In certain embodiments, compensator 185 provides the appropriate frequency domain compensation by use of digital filter coefficients D1, A1, A2, . . . An, B1, B2, , . . . Bn and gain coefficient, G1 by use of digital filter 400. In other embodiments, compensator 185 provides the appropriate frequency domain compensation by use of digital filter coefficients, $C_0$, $C_2$ $C_3$, . . . $C_{N-2}$ and $C_{N-1}$ by use of digital filter 300. In other embodiments, compensator 185 provides the appropriate frequency domain compensation by use of an analog filter. In certain embodiments, gain coefficient, Gi may be equal to one and therefore not needed. In certain embodiments, for operation at the base velocity, compensator 185 may be implemented by servo signal processor 192 providing an interrupt signal synchronous with the first sample frequency to a processing system (i.e. processing system 600) to begin a calculation for implementing a digital filter for compensator 185. In response to the processing system receiving the interrupt signal, the processing system provides an output value, h(k), that produces a maximum phase response at the first crossover frequency and therefore provides stable operation of servo control system 100 to control the lateral position of the tape head relative to the moving tape. This mode of operation can be better explained with reference to curve 811 shown in FIG. 8. Curve 811, is for operation at a first tape velocity, V=V1, the base tape velocity. The solid up arrows represent the tape head position signals that are synchronous with first sample frequency, f1 at period t1=1/f1. Tape head position signals that are synchronous with a sample frequency and/or interrupt signal are considered synchronous if, for example, the tape head position signals occur within a specified time window relative to interrupt signal 193 and/or a specified phase of, for example a feature of the periodic waveform of the sample frequency signal. Synchronous operation of processing system 600 to implement the compensator provides minimum phase delay between the time the tape head position signals that are synchronous with first sample frequency, f1 are available and the actual output value, h(k) from the digital filter (i.e. digital filter 300 or 400) used to provide transfer function of the compensator. For example, tape head position signals 195 and interrupt signal 193 are produced by servo signal processor 192 almost instantaneously upon detection of the servo pattern on the tape by the tape head at the head tape interface 172. Interrupt signal 193 causes processing system 600 to perform the calculation (i.e. implantation of the digital filter) and produce and output value, h(k) within a few instruction cycles, resulting in processing system 600 producing output values synchronous with the detection of the servo pattern by the tape head. In certain embodiments, tape head position signals 195 and interrupt signal 193 are produced together with a small time delay between them, the time delay may cover a range or "window of time" where tape head position signals 195 and interrupt signal 193 are considered to be practically coincident with each other.

In certain embodiments, for operation at the base tape velocity, the processing system provides an output value, h(k), that produces a maximum phase response at the first crossover frequency by using a digital filter (i.e. digital filter 400) to produce output value h(k), where $$h(k) = \left[ D1(g(k)) + \sum_{n=1}^{N} X_n(k) \right], X_n(k) = A_n g(k-1) + B_n X_n(k-1),$$

N is greater than zero, g(k) is proportional to said second tape head position signals, g(k-1) equals a previous value for g(k) and D1, An, Bn are constants. For the representative sample shown by open loop responses 500 (FIG. 5), N=4 is used, yielding a fourth order digital filter (i.e. digital filter 400) implementation for compensator 185. Providing interrupt signal 193 synchronous with the first sample frequency to processing element 610 of processing system 600, may be accomplished by servo signal processor 192, selecting to send interrupt signal 193 synchronous with every tape head position signal. Processing system 600 may be designed or programmed to process tape head position signals coincident with interrupt signals, for example by requiring that tape head position signals 195 occur within a specified time window relative to interrupt signal 193 to be considered coincident, and therefore processed by processing system 600.

In certain embodiments, for operation at the base tape velocity, the processing system provides an output value, h(k), that produces a maximum phase response at the first crossover frequency by using a digital filter (i.e. digital filter 300) to produce output value h(k), where $$h(k) = \sum_{n=0}^{N} C_n g(k-n),$$

N is greater than zero, g(k) is proportional to said second tape head position signals, g(k-n) equals the nth previous value for g(k), and digital filter coefficients, $C_n$, are constants. For the representative sample shown by open loop responses 500 (FIG. 5), N=17 is used, yielding a seventeenth order digital filter (i.e. digital filter 300) implementation for compensator 185. Providing interrupt signal 193 synchronous with the first sample frequency to processing element 610 of processing system 600, may be accomplished by servo signal processor 192, selecting to send interrupt signal 193 synchronous with every tape head position signal. Processing system 600 may be designed or programmed to process tape head position signals coincident with interrupt signals, for example by requiring that tape head position signals 195 occur within a specified time window relative to interrupt signal 193 to be considered coincident, and therefore processed by processing system 600.

At step 720 the tape transport is moving the magnetic tape at a second tape velocity that is a multiple of the base tape velocity. The tape velocity may be changed to a second tape velocity that is a multiple, M of the first tape velocity, (i.e. from V1 to V2, where V2=M*V1) by for example tape transport system 200. Changing the tape velocity may be the result of command to tape transport system 200 to increase or decrease the tape velocity to accommodate a different read/write data rate to tape 206 or for other system operation requirements. Although, the operation of this embodiment is described with reference to a change in tape velocity within a range of values, it will be apparent to those skilled in the art having the benefit of this disclosure that a larger changes in tape velocity may also be accommodated by the appropriate scaling of the respective frequencies, velocities, etc, to a larger range of values.

At step 725, servo signal processor 192 is producing second tape head position signals from the tape head at a second sample frequency, f2 that is proportional to the first sample frequency, f1 multiplied by multiple, M. For example, it may be necessary to operate tape transport system, 200 at a tape velocity, V2 that equals 2*V1. With M=2, then the tape head position signals 195 are available at a second sample frequency, f2, where f2=2*f1.

Figure 9:
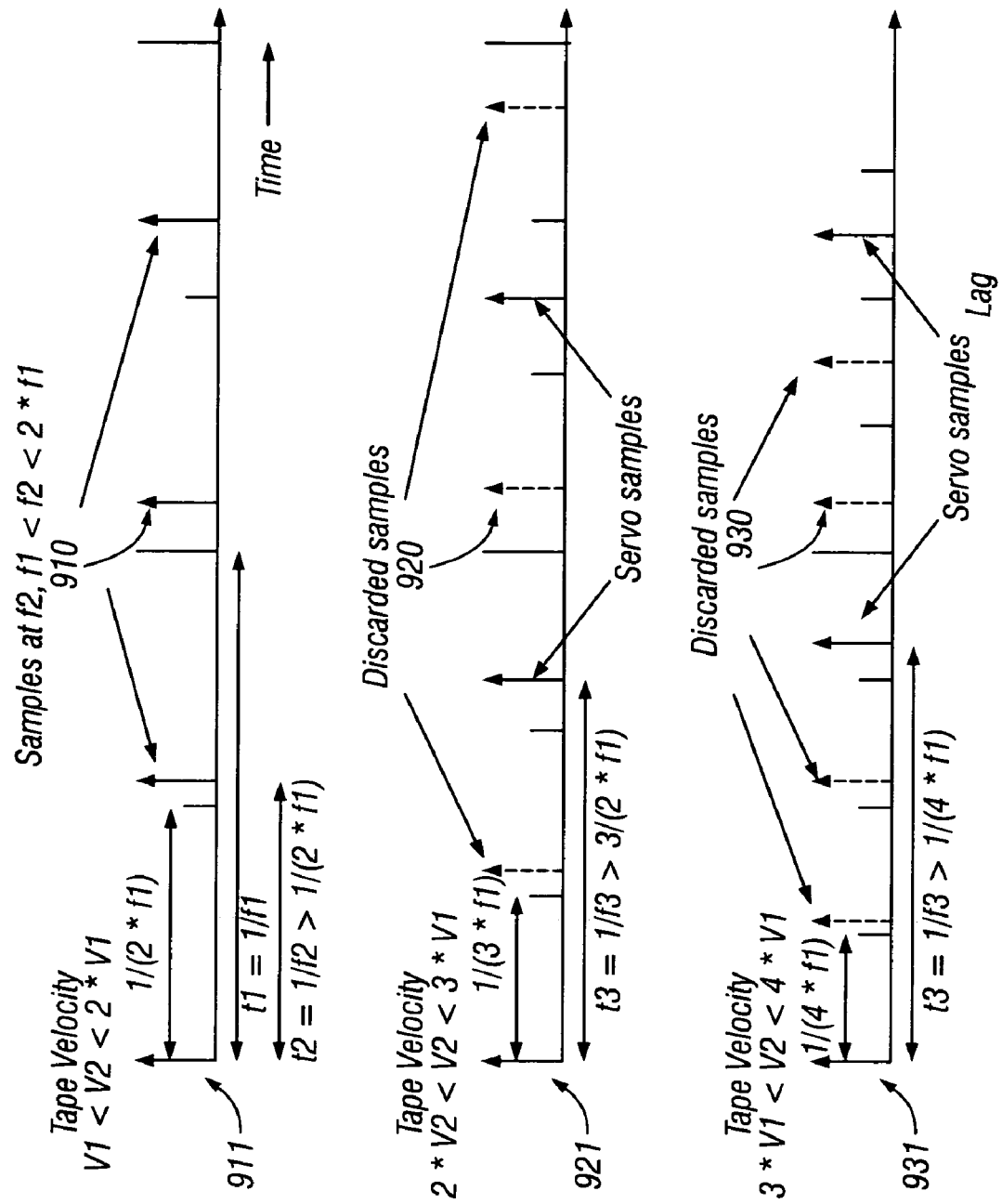
FIG. 9 is a diagram showing time periods for obtaining and discarding tape head position signals for non-integer values of normalized tape velocities.

At step 730, the value of multiple, M determines the mode of operation for servo control system 100. In response to multiple, M being an integer greater than one, control transfers to step 735. At step 735, servo control system 100 operates by controlling the position of tape head 210 by processing the second tape head position signals that are synchronous with first sample frequency, f1 and discarding second tape head position signals that are not synchronous with first sample frequency, f1. This mode of operation can be better explained with reference to curve 821 shown in FIG. 8. Curve 821, is for operation at a second tape velocity, V2 =2*V1, yielding M equal to an integer value of 2. The solid up arrows represent the second tape head position signals that are synchronous with first sample frequency, fi at period t1=1/f1. Tape head position signals that are synchronous with a sample frequency and/or interrupt signal are considered synchronous if, for example, the tape head position signals occur within a specified time window relative to interrupt signal 193 and/or a specified phase of, for example a feature of the periodic waveform of the sample frequency signal. Synchronous as used in this disclosure may be best understood with reference to FIGS. 8 and 9, where the discarded samples 820 of tape head position signals 195 are not synchronous and the servo samples of tape head position signals 195 (shown with the solid up arrows and labeled "servo samples") are synchronous with the specified sample frequency. Discarded samples, 820 of tape head position signals 195 are represented by the dashed up arrows and are discarded because the second tape head position signals that are available at these sample times are not synchronous with first sample frequency, fi. For M=2, evexy other tape head position signal is discarded, leaving tape head position signals at sample frequency, fi, for use by servo control system 100 (FIG. 1). In operation, the samples of tape head position signals 195 may be discarded by, for example, processor 610 (FIG. 6) having instructions, software, hardwire coding, logic configuration or other means for upon receiving an interrupt signal (for example, interrupt signal 193 from servo signal processor 192) discarding tape head position signals based on the timing relationship between interrupt signal 193, tape head position signals 195, the tape velocity and the frequency of the samples of tape head position signals 195. For example, processor 610 may execute instructions that are dependent upon the frequency of interrupt signal 193 received. For a given frequency range of interrupt signal 193 a branch to instructions that discard a selected number of tape head position signals 195 may be executed. As the given frequency range of interrupt signal 193 changes, the branch to instructions that discard a selected number of tape head position signals 195 may be changed to cover a wide range. For M=2, tape head position signals 195 occur at second sample frequency, f2 =2*f1. By discarding every other sample of tape head position signals 195, the compensator may operate at first crossover frequency, fc1 (i.e. curve 502 and curve 512, FIG. 5). Any integer value of multiple, M, may result in similar operation by the branch to step 735 from step 730. For example, curve 826 (FIG. 8), is for operation at a second tape velocity, V2=3*V1, yielding multiple, M equal to an integer value of 3. The solid up arrows represent the second tape head position signals that are synchronous with first sample frequency, f1 at period t1=1/f1. Discarded samples, 825 of tape head position signals 195 are represented by the dashed up arrows and are discarded because the second tape head position signals that are available at these sample times are not synchronous with first sample frequency, f1. For M=3, two out of three tape head position signals are discarded, leaving tape head position signals at sample frequency, f1, for use by servo control system 100. In operation, the samples of tape head position signals 195 may be discarded by, for example, processor 610 (FIG. 6) as described above for M=2. For M=3, tape head position signals 195 occur at second sample frequency, f2 =3*f1. By discarding every other sample of tape head position signals 195, the compensator may operate at first crossover frequency, fc1 (i.e. curve 502 and curve 512, FIG. 5). Another example of operation for an integer value for M is shown by, curve 831 (FIG. 8), for operation at a second tape velocity, V2 =4*V1, yielding M equal to an integer value of 4. The solid up arrows represent the second tape head position signals that are synchronous with first sample frequency, f1 at period t1=1/f1. Discarded samples, 830 of tape head position signals 195 are represented by the dashed up arrows and are discarded because the second tape head position signals that are available at these sample times are not synchronous with first sample frequency, f1. For M=4, three out of four tape head position signal are discarded, leaving tape head position signals at sample frequency, f1, for use by servo control system 100. In operation, the samples of tape head position signals 195 may be discarded by, for example, processor 610 (FIG. 6) as described above for M=2. For M=4, tape-head position signals 195 occur at second sample frequency, f2 =4*f1. By discarding three out of four samples of tape head position signals 195 of tape head position signals 195, the compensator may operate at first crossover frequency, fc1 (i.e. curve 502 and curve 512, FIG. 5).

In certain embodiments, servo control system 100, processes the second tape head position signals that are synchronous with the first sample frequency, f1 and discards the second tape head position signals that are not synchronous with the first sample frequency, f1 by providing interrupt signal 193 synchronous with the first sample frequency to processing system 600. In response to processing system 600 receiving interrupt signal 193, processing system 600 provides an output value, h(k), comprising $$h(k) = G1\left[D1(g(k)) + \sum_{n=1}^{N} X_n(k)\right],$$

where $$X_n(k) = A_n g(k-1) + \frac{B_n}{G1} X_n(k-1)$$

and N is the order of the filter, N>1, g(k) is proportional to the second tape head position signals, g(k−1) equals the previous value for g(k), D1, An, Bn are constants for digital filter coefficients and Gi is a gain coefficient. For the representative sample shown by open loop responses 500 (FIG. 5), N=4 is used, yielding a fourth order digital filter (i.e. digital filter 400) implementation for compensator 185. Providing interrupt signal 193 synchronous with the first sample frequency to processing element 610 of processing system 600, may be accomplished by servo signal processor 192, selecting to send interrupt signal 193 synchronous with every other tape head position signal (i.e. for M=2), so that every other tape head position signal is discarded (curve 821, FIG. 8), leaving tape head position signals at sample frequency, f1, for use by servo control system 100. Processing system 600 may be designed or programmed to only process tape head position signals coincident with interrupt signals, for example by requiring that tape head position signals 195 occur within a specified time window relative to interrupt signal 193 to be considered coincident, and therefore processed by processing system 600. Alternatively, the samples of tape head position signals 195 may be discarded before they are sent to processor 610 (FIG. 6) by having instructions, software, hardwire coding, logic configuration or other means in servo signal processor 192. This may be used for other values of M, without limitation. Each value of k, represents an interval where an output h(k) from an input g(k) for processing system 600 is produced. For example, a first output, h(1), (i.e. k=1) may be produced by processing system 600 upon receiving a first interrupt signal 193 and a tape head position signal 195. A next output value, h(2), (i.e. k=2) may be produced by processing system 600 upon receiving a next interrupt signal 193 and the next tape head position signal 195, etc. All of the outputs, h(k) together producing a continuous signal (possibly with post processing using an D/A converter and low pass filter) for controlling the position of the tape head.

If at step 730, the value of multiple, M is not an integer then step 740 is executed. In response to multiple, M not being an integer and less than two, step 745 is executed. At step 745 servo control system 100 controls the position of the tape head by processing the second tape head position signals synchronous with the second sample frequency, f2 where f2=M*f1. This mode of operation may be understood by reference to curve 911 shown in FIG. 9. Curve 911, is for operation at a second tape velocity, V2 =M*V1, where M<2 and non integer. For values of multiple, M less than 1, curve 911 may be used with t2=1/f1>1/f1. The solid up arrows represent the second tape head position signals that are synchronous with second sample frequency, f2, at period t2=1/f2, where 0<f2<2*f1. For curve 911, no samples of tape head position signals 195 are discarded so that tape head position signals at sample frequency, f2, are used by servo control system 100. In operation, the samples of tape head position signals 195 are selected by, for example, processor 610 (FIG. 6) having instructions, software, hardwire coding, logic configuration or other means for upon receiving an interrupt signal (for example, interrupt signal 193 from servo signal processor 192) accepting tape head position signals based on the timing relationship between interrupt signal 193, tape head position signals 195, the tape velocity and the frequency of the samples of tape head position signals 195. After execution of step 745, step 748 is executed. At step 748 compensator 185 is modified to have a maximum phase response at a frequency, fp, that is approximately equal to first crossover frequency, fc1, multiplied by multiple, M and to have a second crossover frequency, fc2 approximately equal to the first crossover frequency, fc1. In operation, it is desirable to have second crossover frequency, fc2 equal to first crossover frequency, fc1, resulting in no change in the bandwidth of the servo system, however in practice, small variations in component responses (i.e. the actuator controlling the position of tape head 210) may result in fc2 being approximately equal to fc1. As M increases, fp increases proportionally, yielding a potential larger bandwidth of operation for servo control system 100. To maintain fc2 =fc1, it is necessary to change the gain coefficient, G1. For example, when multiple M =1, (for the base tape velocity) operation at first crossover frequency, fc1, may be represented by the open loop magnitude response curve 501 and phase response curve 511 shown in FIG. 5. Increasing M greater than one may result in magnitude response curve 503 and phase response curve 513 with a corresponding increase in the maximum phase response frequency, fp and almost no change in the crossover frequency (i.e. fc2 =fc1). Decreasing M less than one may result in magnitude response curve 502 and phase response curve 512 with a corresponding decrease in the maximum phase response frequency, fp and almost no change in the crossover frequency (i.e. fc2 =fc1).

At step 748, compensator 185 operates at second crossover frequency, fc2 by modifying compensator 185 to have a maximum phase response at a frequency that is approximately equal to first crossover frequency, fc1 multiplied by multiple, M and to have a second crossover frequency, fc2 approximately equal to first crossover frequency, fc1. This may be accomplished by servo signal processor 192 providing an interrupt signal synchronous with second sample frequency, f2 to processing system 600. In response to processing system 600 receiving interrupt signal 193, processing system 600 provides an output value, h(k), comprising $$h(k) = G2\left[D1(g(k)) + \sum_{n=1}^{N} X_n(k)\right],$$

where $$X_n(k) = A_n g(k-1) + \frac{B_n}{G2} X_n(k-1),$$

N is the order of the filter, N>1, g(k) is proportional to second tape head position signals, g(k−1) equals the previous value for g(k), D1, An, Bn are constants for digital filter coefficients and G2 is a gain coefficient, where G2 is greater than zero and approximately less than multiple, 2*M squared (i.e. 0<G2<2*M²m *G1).

Operation of compensator 185 at second crossover frequency, fc2 is quickly and efficiently accomplished for servo control system, 100, described herein. By providing interrupt signal, 193 synchronous with second sample frequency, f2 to processing system 600, where the scaling of second sample frequency, f2, relative to first sample frequency, f1 is the same scaling required (i.e. my multiple, M) for the scaling of frequency of the maximum phase response that is approximately equal to first crossover frequency, fc1 multiplied by multiple, M, results in no change to digital filter coefficients D1, An and Bn, because for constant digital filter coefficients D1, An and Bn, the poles and zeros and the resulting phase response of digital filter 400 scales with the sample frequency. The gain coefficient, G2 is the only constant that may require change as servo control system 100 is operated at different sampling frequencies, f1, f2, f3, etc. Because only one constant must be changed for the calculations performed by processing system 600, memory requirements are reduced, software is reduced, transition time between operation at different tape velocities is reduced along with a reduction in system complexity. Gain coefficient, G2 depends upon M and the exact system design. For example, if G1=1 for first crossover frequency, fc1, then G2 for second crossover frequency, fc2≈fc1 may range from approximately 0<G1<2*M².

In certain embodiments, in response to multiple, M, being less than one, gain coefficient, G2, is approximately equal to a value of gain coefficient, G1, used for first crossover frequency, fc1, (i.e. for M=1) multiplied by multiple, M, squared (i.e. G2(fc2)≈M²*G1(fc1)). For open loop responses 500 (FIG. 5), N=4, and a second order frequency domain actuator transfer function, Act(s) (i.e. Act(s)=1/s², where s=σ+jω) is assumed, G2 should be scaled by ≈M² as M decreases below one to maintain no change in the crossover frequency and corresponding bandwidth of operation for servo control system 100. In certain embodiments, interactions between the actuator transfer function, Act(s), and the transfer function of the actuator (i.e actuator 180), may require that G1 is scaled linearly by M as M decreases below one. In certain embodiments, the transfer function of compensator 185, may be first order, third order, etc. and therefore require that G1 is scaled linearly by M, M³, etc. respectively as M decreases.

In certain embodiments, in response to multiple, M, being greater than one, gain coefficient, G2, is approximately equal to a value of gain coefficient, G1, used for first crossover frequency, fc1, (i.e. for M=1) multiplied by multiple, M, (i.e. G2(fc2)≈M*G1(fc1)). For open loop responses 500 (FIG. 5), N=4, and a second order frequency domain actuator transfer function, Act(s) (i.e. Act(s)=1/s², where s=σ+jω)) is assumed, G2 should be scaled by ≈M as M increases to values greater than one to maintain no change in the crossover frequency and corresponding bandwidth of operation for servo control system 100. In certain embodiments, interactions between the actuator transfer function, Act(s), and the transfer function of compensator 185, may require that G2 is scaled sub-linearly by M as M increases above one. In certain embodiments, the transfer function of the actuator (i.e actuator 180), may be first order, third order, etc. and therefore require that G2 is scaled linearly by M, M³, etc. respectively as M increases. After execution of step 748, control flows to step 795 to end.

If at step 740, the value of multiple, M is not an integer and greater than 2 then step 760 is executed. At step 760 servo control system 100 controls the position of the tape head by processing the second tape head position signals synchronous with a third sample frequency, f3 where f3=K*f1, where scaling number, K=M/(integer value of M) and discarding the second tape head position signals that are not synchronous with third sample frequency, f3. This mode of operation may be understood by reference to curves 921 and 931 shown in FIG. 9. Curve 921, is for operation at a second tape velocity, V2=M*V1, where 2<M<3. The solid up arrows represent the second tape head position signals that are synchronous with third sample frequency, f3, at period t3=1/f3, where $$t3 > \frac{2}{3f1}.$$

For curve 921, discarded samples, 920 of tape head position signals 195 are represented by the dashed up arrows and are discarded because the second tape head position signals that are available at these sample times are not synchronous with third sample frequency, f3. For 2<M<3, every other tape head position signal is discarded, leaving tape head position signals at third sample frequency, f3, for use by servo control system 100. In operation, the samples of tape head position signals 195 may be discarded as explained above with reference to curve 821, 826 and 831 of FIG. 8. After execution of step 760, step 770 is executed. At step 770, compensator 185 is modified to have a maximum phase response at a frequency that is approximately equal to first crossover frequency, fc1 multiplied by scaling number, K and to have a second crossover frequency, fc2 approximately equal to first crossover frequency, fc1. In operation, it is desirable to have second crossover frequency, fc2 equal to first crossover frequency, fc1, resulting in no change in the bandwidth of the servo system, however in practice, small variations in component responses (i.e. the actuator controlling the position of tape head 210) may result in fc2 being approximately equal to fc1. As K increases, fp increases proportionally, yielding a potential larger bandwidth of operation for servo control system 100. To maintain fc2≈fc1, it is necessary to change the gain coefficient, G1. For example, when multiple M=1, operation at first crossover frequency, fc1, may be represented by the open loop magnitude response curve 501 and phase response curve 511 shown in FIG. 5. Increasing M and therefore K, may result in magnitude response curve 503 and phase response curve 513 with a corresponding increase in the maximum phase response frequency, fp and almost no change in the crossover frequency (i.e. fc2≈fc1).

At step 770, compensator 185 operates at second crossover frequency, fc2 by modifying compensator 185 to have a maximum phase response at a frequency that is approximately equal to first crossover frequency, fc1 multiplied by scaling number, K and to have a second crossover frequency, fc2 approximately equal to first crossover frequency, fc1.

This may be accomplished by servo signal processor 192 providing an interrupt signal synchronous with third sample frequency, f3 to processing system 600. In response to processing system 600 receiving interrupt signal 193, processing system 600 provides an output value, h(k), comprising $$h(k) = G3\left[D1(g(k)) + \sum_{n=1}^{N} X_n(k)\right],$$

where $$X_n(k) = A_n g(k-1) + \frac{B_n}{G3} X_n(k-1),$$

N is the order of the filter, N>1, g(k) is proportional to second tape head position signals, g(k−1) equals the previous value for g(k), D1, An, Bn are digital filter coefficients and G3 is a gain coefficient, where G3 has an approximate range from zero to $2*K^2$ squared (i.e. $0=G3<2*K2*G1$).

Operation of compensator 185 at second crossover frequency, fc2 is quickly and efficiently accomplished for servo control system, 100, described herein. By providing interrupt signal, 193 synchronous with third sample frequency, f3 to processing system 600, where the scaling of third sample frequency, f3, relative to first sample frequency, f1 is the same scaling required (i.e. by scaling number, K) for the scaling of frequency of the maximum phase response that is approximately equal to first crossover frequency, fc1 multiplied by scaling number, K results in no change to digital filter coefficients D1, An and Bn, because for constant digital filter coefficients D1, An and Bn, the poles and zeros and the resulting phase response of digital filter 400 scales with the sample frequency. The gain coefficient, G3 is the only constant that may require change as servo control system 100 is operated at different sampling frequencies, f1, f2, f3, etc. Because only one constant must be changed for the calculations performed by processing system 600, memory requirements are reduced, software is reduced, transition time between operation at different tape velocities is reduced along with a reduction in system complexity. Gain coefficient, G3 depends upon M and the exact system design. For example, if G1=1 for first crossover frequency, fc1, then G3 for second crossover frequency, fc2≈fc1 may range from approximately $0<G3<2*M^2$.

In certain embodiments, (10) for operation at second crossover frequency, fc2, gain coefficient, G3, is approximately equal to a value of gain coefficient, G1, used for first crossover frequency, fc1, multiplied by the scaling number, K (i.e. G3(fc2)≈K*G1(fc1)). For example, if G1=1 for first crossover frequency, fc1, (i.e. M=1) then G3 for second crossover frequency, fc2 may range from $0<G3<2*K^2$. For open loop responses 500 (FIG. 5), N=4, and a second order frequency domain actuator transfer function, Act(s) (i.e. Act(s)=1/s², where s=σ+jω) is assumed, G3 should be scaled by ≈K as K increases to values greater than one to maintain no change in the crossover frequency and corresponding bandwidth of operation for servo control system 100. In certain embodiments, interactions between the actuator transfer function, Act(s), and the transfer function of compensator 185, may require that G1 is scaled sub-linearly by K as K increases above one. In certain embodiments, the transfer function of the actuator (i.e. fine actuator 180) may be first order, third order, etc. and therefore require that G1 is scaled linearly by K, $K^3$, etc. respectively as K increases.

If multiple, M is not an integer and greater than 3 then the operation is the same as described above for M>2. Another example is now presented to further illustrate the operation of the embodiments described herein. For this example, servo control system 100 controls the position of the tape head by processing the second tape head position signals synchronous with a third sample frequency, f3 where f3 =K *f1, where scaling number, K =M/(integer value of M) and discarding the second tape head position signals that are not synchronous with third sample frequency, f3. This mode of operation may be understood by reference to curve 931 shown in FIG. 9. Curve 931 is for operation at a second tape velocity, V2M*V1, where 3<M<4. The solid up arrows represent the second tape head position signals that are synchronous with second sample frequency, f3, at period t3=1/f3, where $$f3 > \frac{3}{4f1}.$$

For curve 931, discarded samples, 930 of tape head position signals 195 are represented by the dashed up arrows and are discarded because the second tape head position signals that are available at these sample times are not synchronous with third sample frequency, f3. For 3<M<4, two out of three tape head position signal are discarded, leaving tape head position signals at third sample frequency, f3, for use by servo control system 100. In operation, the samples of tape head position signals 195 may be discarded as explained above with reference to curve 821, 826 and 831 of FIG.8. Compensator 185 is modified to have a maximum phase response at a frequency that is approximately equal to first crossover frequency, fc1 multiplied by scaling number, K and to have a second crossover frequency, fc2 approximately equal to first crossover frequency, fc1. In operation, it is desirable to have second crossover frequency, fc2 equal to first crossover frequency, fc1, resulting in no change in the bandwidth of the servo system, however in practice, small variations in component responses (i.e. the actuator controlling the position of tape head 210) may result in fc2 being approximately equal to fc1. As K increases, fp increases proportionally, yielding a potential larger bandwidth of operation for servo control system 100. To maintain fc2 ≈fc1, it is necessary to change the gain coefficient, G1. For example, when multiple M =1, operation at first crossover frequency, fc1, may be represented by the open loop magnitude response curve 501 and phase response curve 511 shown in FIG. 5. Increasing M and therefore K, may result in magnitude response curve 503 and phase response curve 513 with a corresponding increase in the maximum phase responses frequency, fp and almost no change in the crossover frequency (i.e. fc2 ≈fc1).

Compensator 185 operates at second crossover frequency, fc2 by modifying compensator 185 to have a maximum phase response at a frequency that is approximately equal to first crossover frequency, fc1 multiplied by scaling number, K and to have a second crossover frequency, fc2 approximately equal to first crossover frequency, fc1. This may be accomplished by servo signal processor 192 providing an interrupt signal synchronous with third sample frequency, f3 to processing system 600. In response to processing system 600 receiving interrupt signal 193, processing system 600 provides an output value, h(k), comprising $$h(k) = G3\left[D1(g(k)) + \sum_{n=1}^{N} X_n(k)\right],$$

where $$X_n(k) = A_n g(k-1) + \frac{B_n}{G3} X_n(k-1),$$

N is the order of the filter, N≈1, g(k) is proportional to second tape head position signals, g(k−1) equals the previous value for g(k), D1, An, Bn are digital filter coefficients and G3 is a gain coefficient, where G3 has an approximate range from zero to $2*K^2$ squared (i.e. $0<G3<2*K2*K^{2*}$ G1).

Operation of compensator 185 at second crossover frequency, fc2 is quickly and efficiently accomplished for servo control system, 100, described herein. By providing interrupt signal 193 synchronous with third sample frequency, f3 to processing system 600, where the scaling of third sample frequency, f3, relative to first sample frequency, f1 is the same scaling required (i.e. by scaling number, K) for the scaling of frequency of the maximum phase response that is approximately equal to first crossover frequency, fc1 multiplied by scaling number, K results in no change to digital filter coefficients D1, An and Bn, because for constant digital filter coefficients D1, An and Bn, the poles and zeros and the resulting phase response of digital filter 400 scales with the sample frequency. The gain coefficient, G3 is the only constant that may require change as servo control system 100 is operated at different sampling frequencies, f1, f2, f3, etc. Because only one constant must be changed for the calculations performed by processing system 600, memory requirements are reduced, software is reduced, transition time between operation at different tape velocities is reduced along with a reduction in system complexity. Gain coefficient, G3 depends upon M and the exact system design. For example, if G1=1 for first crossover frequency, fc1, then G3 for second crossover frequency, fc2≈fc1 may range from approximately $0<G3<2*M^2$.

In certain embodiments, for operation at second crossover frequency, fc2, gain coefficient, G3, is approximately equal to a value of gain coefficient, G1, used for first crossover frequency, fc1, multiplied by the scaling number, K (i.e. G3(fc2)≈K*G1(fc1)). For example, if G1=1 for first crossover frequency, fc1, then G3 for second crossover frequency, fc2 may range from $0<G3<2*K^2$. For open loop responses 500 (FIG. 5), N=4, and a second order frequency domain actuator transfer function, Act(s) (i.e. Act(s)=1/s², where s=σ+jω) is assumed, G3 should be scaled by ≈K as K increases to values greater than one to maintain no change in the crossover frequency and corresponding bandwidth of operation for servo control system 100. In certain embodiments, interactions between the actuator transfer function, Act(s), and the transfer function of compensator 185, may require that G1 is scaled sub-linearly by K as K increases above one. In certain embodiments, the transfer function of the actuator (i.e. fine actuator 180) may be first order, third order, etc. and therefore require that G1 is scaled linearly by K, $K^3$, etc. respectively as K increases.

Figure 10:
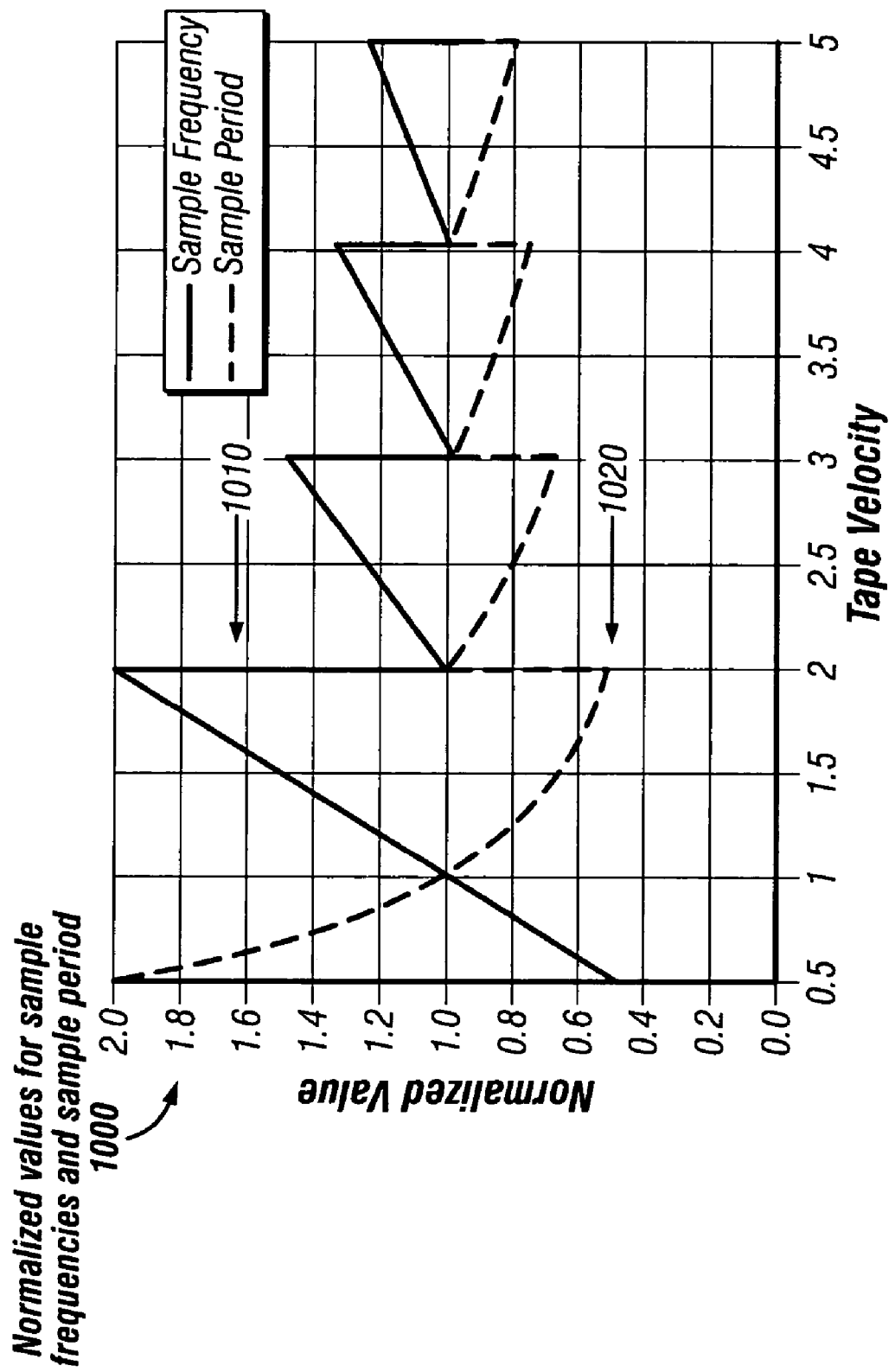
FIG. 10 is a diagram showing normalized values for sample frequencies and sample periods for tape head position signals for different values of normalized tape velocities.

Operation of the embodiments described above may be better understood with reference to FIG. 10, where the normalized values for sample frequency 1020 and sample period 1000, for different tape velocities are shown in graphical form. Curve 1010 is the normalized sample frequency and curve 1020 is the normalized sample period. For a normalized tape velocity of 1, the normalized sample frequency 1010 and normalized sample period 1020 are each equal to 1. For non integer values of M, where 1<M<2, the normalized tape velocity, V, has a range of 1<V<2, the normalized sample frequency 1010, f, has a range of 1<f<2, and normalized sample period t=1/f. For integer values of M, where M=1, 2, 3, etc., the normalized tape velocity, V, is also an integer and varies as V=1, 2, 3, etc. At each integer value of the normalized tape velocity, V, the normalized sample frequency 1010, f, has a value of 1 and the normalized sample period t=1/f, is also equal to 1 because at each integer value of the normalized tape velocity, V, tape head position signals are discarded as explained above with reference to curves 821, 826 and 831 (FIG. 8). Also, the normalized crossover frequency, fc, has a value of 1 for each integer value of the normalized tape velocity, V.

As M increases to non integer values above 2, the range of the normalized sample frequency 1010 and normalized sample period, 1020 are each reduced as shown in FIG. 10 because the normalized sample frequency 1010 is determined by multiplying the normalized sample frequency 1010 at the normalized tape velocity, V=1 by scaling number, K, where K=M/(INT(M)), where "INT" take the integer value of M by rounding down M to the nearest integer value. As M decreases to non integer values below 1, the normalized sample frequency 1010 decreases linearly with M and normalized sample period, 1020 increases as shown on FIG. 10. For illustrative purposes, FIG. 10 shows a normalized tape velocity, V, where 0.5≤V≤5, however the embodiments described are not limited to this range for normalized tape velocity, V, and values of normalized tape velocity, V, from zero to large values are within the scope of operation for the embodiments described herein.

In certain embodiments, producing tape head position signals is accomplished using a timing based servo system. A description of one implementation of a track following servo system using timing based servo signal for use with embodiments described herein is disclosed in U.S. Pat. No. 6,021,013.

Figure 11:
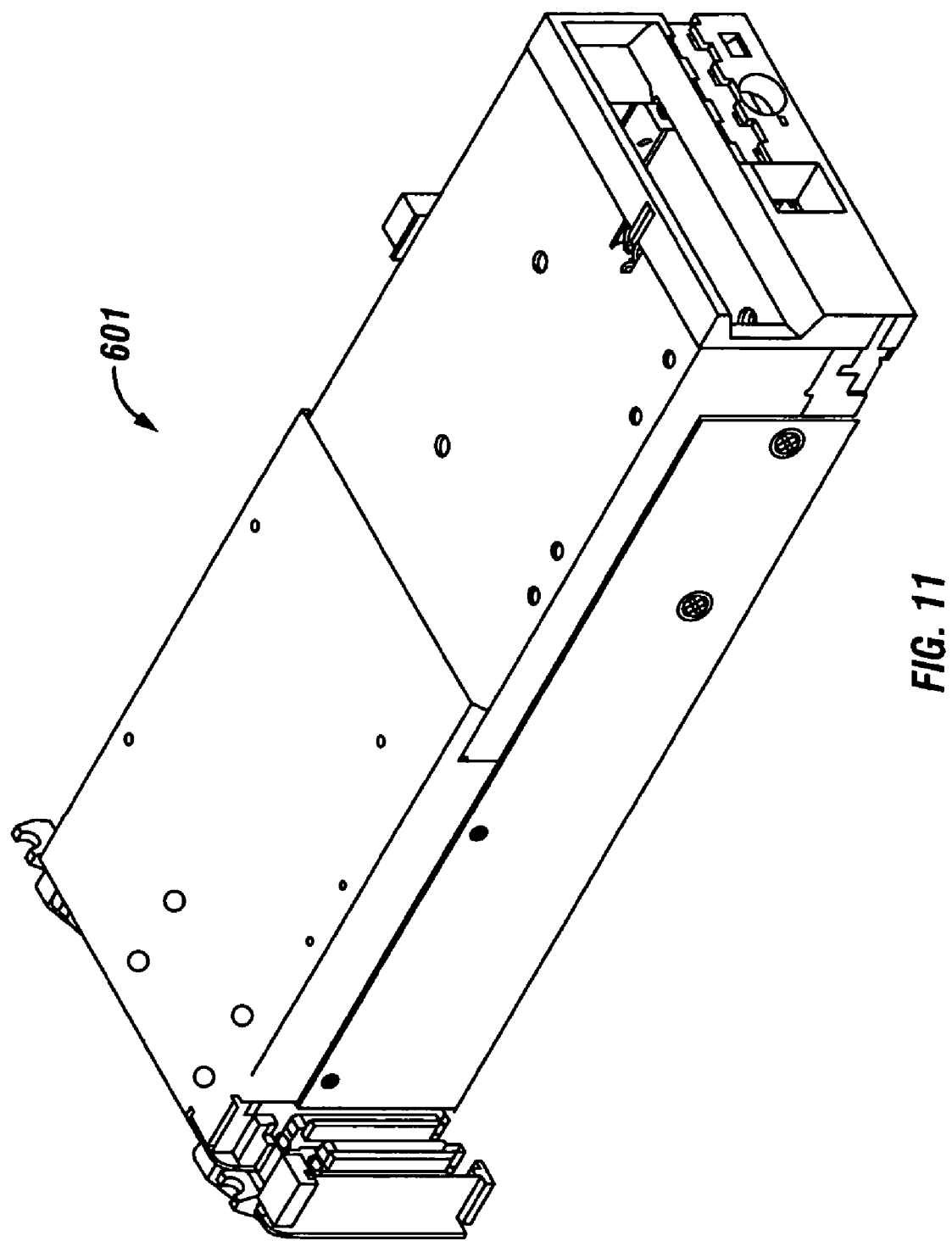
FIG. 11 is a diagram showing a read/write tape drive.

In certain embodiments, one or more of Applicant's embodiments comprises a tape drive for reading and writing data with respect to tape (i.e. tape 206). For example, servo control system 100 and the operation thereof, described herein, without limitation is used in a read/write tape drive, for example, a read/write tape drive as shown in FIG. 11 to provide tape head position control for the effective writing and reading of data with respect to magnetic tape. U.S. Pat. No. 6,813,112 assigned to the common assignee herein, describes such a read/write tape drive and is hereby incorporated by reference.

Figure 12:
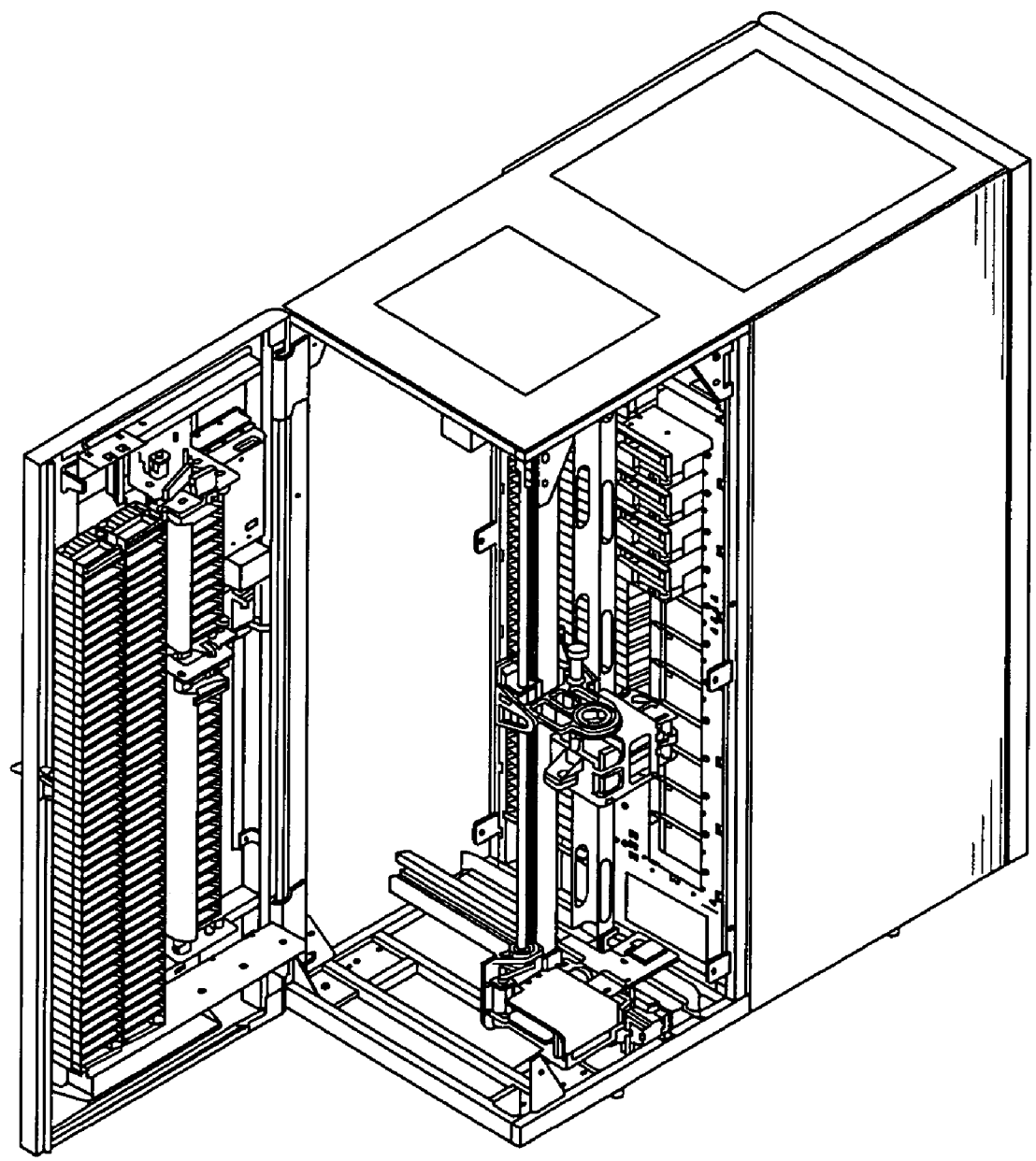
FIG. 12 is a diagram showing an automated data storage library.

In certain embodiments, one or more of Applicant's embodiments comprises an automated data storage library for accessing data storage media. The automated data storage library comprising for example, an accessor for accessing and moving the data storage media; and storage shelves for storage of the data storage media. For example, servo control system 100 and the operation thereof, described herein, without limitation is used in a read/write tape drive, in for example, automated data storage library shown in FIG. 12 to provide tape head position control for the effective writing and reading of data with respect to magnetic tape associated with the data storage media. U.S. Pat.

No. 6,356,803 assigned to the common assignee herein, describes such an automated media library and is hereby incorporated by reference.

It will be appreciated by those skilled in the art that although the embodiments have been described with reference to a time based servo signal, the present invention is not intended to be limited to time based servo signals. Rather, the present invention may be used with any servo signals.

The invention disclosed herein may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In certain embodiments, Applicant's invention includes instructions, where those instructions are executed by processor 610 (FIG. 6) and/or processing element 190 (FIG. 1) to perform steps recited in the flowchart shown in FIG. 7.

In other embodiments, Applicant's invention includes instructions residing in any other computer program product, where those instructions are executed by a computer external to, or internal to, servo control system 100. In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

Certain embodiments may be directed toward a method for deploying computing infrastructure by a person or by an automated processing system, comprising integrating computer readable code into a system to perform the operations for the described embodiments. For example, FIG. 7 illustrates steps for controlling a position of a tape head by use of the described embodiments. The code in combination with the system (i.e. servo control system 100) is capable of performing the steps for the operation of the embodiments described herein. The deployment of the computing infrastructure may be performed during service, manufacture and/or configuration of the embodiments described herein. For example, a consulting business may have service responsibility for a number of systems. Such service responsibility may include such tasks as system upgrades, error diagnostic, performance tuning and enhancement, installation of new hardware, installation of new software, configuration with other systems, and the like. As part of this service, or as a separate service, the service personnel may configure the system according to the techniques described herein so as to efficiently enable operation of the embodiments described herein. For example, such a configuration could involve the loading into memory of computer instructions, parameters, constants (i.e. digital filter coefficient constants An, Bn, etc.), interrupt vectors, so that when the code is executed, the system may carry out the techniques described to implement the embodiments described herein.

The foregoing description, for purposes of explanation, used specific nomenclature to provide a thorough understanding of the present invention. However, it will be apparent to one skilled in the art that the specific details are not required in order to practice the present invention. In other instances, well known circuits and devices are shown in block diagram form in order to avoid unnecessary distraction from the present invention. Thus, the foregoing descriptions of specific embodiments of the present invention are presented for purposes of illustration and description. They are not intended to be exhaustive or to limit the present invention to the precise forms disclosed. Obviously many modifications and variations are possible in view of the above teachings.

The logic of FIG. 7 describes specific operations occurring in a particular order. In alternative implementations, certain of the logic operations may be performed in a different order, modified or removed. Moreover, steps may be added to the above described logic and still conform to the described implementations. Further, operations described herein may occur sequentially or certain operations may be processed in parallel, or operations described as performed by a single process may be performed by distributed processes.

The logic of FIG. 7 was described as being implemented in software. This logic may be part of the operating system of a host system or an application program. In yet further implementations, this logic may be maintained in storage areas managed by servo control system 100 or in a read only memory or other hardwired type of device. The preferred logic may be implemented in hard disk drives or in programmable and non-programmable gate array logic.

The embodiments were chosen and described in order to best explain the principles of the present invention and its practical applications, to thereby enable others skilled in the art to best utilize the present invention and various embodiments with various modifications as are suited to the particular use contemplated. It is intended that the scope of the present invention be defined by the following claims and their equivalents.

What is claimed is:

1. A method of operating a tape drive for moving a magnetic tape along a tape head at one of a plurality of tape velocities, the method comprising: initially moving the magnetic tape along the tape head at a base tape velocity, producing first tape head position signals at a first sample frequency that is proportional to the base tape velocity and controlling a position of the tape head relative to the magnetic tape based on a processing of the first tape head position signals that are synchronous with the first sample frequency; and subsequently moving the magnetic tape along the tape head at a second tape velocity that is a multiple of the base tape velocity, producing second tape head position signals at a second sample frequency having a timing relationship with the first sample frequency that is proportional to the first sample frequency multiplied by the multiple and controlling the position of the tape head relative to the magnetic tape based on a selective processing and discarding of the second tape head position signals as a function of the timing relationship between the first sample frequency and the second sample frequency.

2. The method of claim 1, wherein in response to the multiple being an integer greater than one: the timing relationship between the first sample frequency and the second sample frequency establishes a processing of the second tape head position signals that are synchronous with the first sample frequency and a discarding of the second tape head position signals that are not synchronous with the first sample frequency.

3. The method of claim 1, wherein in response to the multiple not being an integer and less than two: the timing relationship between the first sample frequency and the second sample frequency establishes a processing of the second tape head position signals that are synchronous with the second sample frequency.

4. The method of claim 1, wherein in response to the multiple not being an integer and greater than two: the timing relationship between the first sample frequency and the second sample frequency establishes a processing of the second tape head position signals that are synchronous with a third sample frequency and a discarding of the second tape head position signals that are not synchronous with the third sample frequency.

5. The method of claim 4, wherein the third sample frequency is equal to the first sample frequency multiplied by a scaling number related to the multiple.

6. The method of claim 5, wherein the scaling number is equal to the multiple divided by an integer value of the multiple.

7. A method for deploying a computer infrastructure, comprising integrating computer readable code into a system for operating a tape drive, the tape drive having a base tape velocity for moving a magnetic tape along a tape head at a base tape velocity and a second tape velocity that is a multiple of the base tape velocity for moving the magnetic tape along the tape head, wherein the code in combination with the system is capable of performing the following: in response to the magnetic tape being moved along the tape head at the base tape velocity, producing first tape head position signals at a first sample frequency that is proportional to the base tape velocity and controlling a position of the tape head relative to the magnetic tape based on a processing of the first tape head position signals that are synchronous with the first sample frequency; and in response to the magnetic tape being moved along the tape head at the second tape velocity, producing second tape head position signals at a second sample frequency having a timing relationship with the first sample frequency that is proportional to the first sample frequency multiplied by the multiple and controlling the position of the tape head relative to the magnetic tape based on a selective processing and discarding of the second tape head position signals as a function of the timing relationship between the first sample frequency and the second sample frequency.

8. The method of claim 7, wherein in response to the multiple being an integer greater than one: the timing relationship between the first sample frequency and the second sample frequency establishes a processing of the second tape head position signals that are synchronous with the first sample frequency and a discarding of the second tape head position signals that are not synchronous with the first sample frequency.

9. The method of claim 7, wherein in response to the multiple not being an integer and less than two: the timing relationship between the first sample frequency and the second sample frequency establishes a processing of the second tape head position signals that are synchronous with the second sample frequency.

10. The method of claim 7, wherein in response to the multiple not being an integer and greater than two: the timing relationship between the first sample frequency and the second sample frequency establishes a processing of the second tape head position signals that are synchronous with a third sample frequency and a discarding of the second tape head position signals that are not synchronous with the third sample frequency.

11. The method of claim 10, wherein the third sample frequency is equal to the first sample frequency multiplied by a scaling number related to the multiple.

12. The method of claim 11, wherein the scaling number is equal to the multiple divided by an integer value of the multiple.

* * * * *